(12) United States Patent
Huenefeld

(10) Patent No.: US 7,125,035 B1
(45) Date of Patent: Oct. 24, 2006

(54) LUBRICATING HITCH RECEIVER COVER

(76) Inventor: Donald A. Huenefeld, 5058 High-On-A-Hill Dr., Hubertus, WI (US) 53033

( * ) Notice: Subject to any disclaimer, the term of this patent is extended or adjusted under 35 U.S.C. 154(b) by 0 days.

(21) Appl. No.: 11/144,499

(22) Filed: Jun. 3, 2005

Related U.S. Application Data

(63) Continuation-in-part of application No. 10/797,524, filed on Mar. 10, 2004, now abandoned.

(51) Int. Cl.
*B60D 1/60* (2006.01)
(52) U.S. Cl. .................................................. 280/507
(58) Field of Classification Search ............... 280/507, 280/504, 511; 150/166; D12/162; 40/591
See application file for complete search history.

(56) References Cited

U.S. PATENT DOCUMENTS

| | | | |
|---|---|---|---|
| 3,596,926 A | 8/1971 | Randall | 280/507 |
| 5,423,566 A * | 6/1995 | Warrington et al. | 280/415.1 |
| 6,068,281 A * | 5/2000 | Szczypski | 280/479.2 |
| 6,186,531 B1 * | 2/2001 | Parent | 280/506 |
| 6,199,892 B1 * | 3/2001 | Dahl | 280/507 |
| 6,788,190 B1 * | 9/2004 | Bishop | 340/435 |
| 2005/0121880 A1 * | 6/2005 | Santangelo | 280/507 |

* cited by examiner

*Primary Examiner*—Tony Winner
(74) *Attorney, Agent, or Firm*—Donald J. Erisler

(57) ABSTRACT

A lubricating hitch receiver cover preferably includes a male body, an end cap, a quantity of a lubricant and a fastener. The end cap terminates one end of the male body. An outer perimeter of the male body is sized to be received by a female cavity of the female hitch receiver. The quantity of lubricant is applied to the outside surface of the male body. A retention hole is formed through a cross section of the male body. The fastener is inserted through the female hitch receiver and the male body to retain the lubricating hitch receiver cover in the female hitch receiver. At least one projection is substituted for the retention hole and the fastener in a second embodiment of the lubricating hitch receiver.

11 Claims, 2 Drawing Sheets

LUBRICATING HITCH RECEIVER COVER

CROSS-REFERENCES TO RELATED APPLICATIONS

This is a continuation-in-part application taking priority from Ser. No. 10/797,524 filed on Mar. 10, 2004, which is now abandoned.

BACKGROUND OF THE INVENTION

1. Field of the Invention

The present invention relates generally to female hitch receivers and more specifically to a lubricating hitch receiver cover that protects a female cavity of a female hitch receiver from rusting, when not in use.

2. Discussion of the Prior Art

Female hitch receivers are used for pulling a variety of items, such as boats and trailers. Decorative inserts for female hitch receivers are well known in the art. However, decorative inserts will not completely protect the female cavity of the female hitch receiver from rusting due to moisture from rain, snow, water splash or a wet hitch. A hitch cannot be inserted into a female hitch receiver that is rusted, thus requiring the rust inside the female cavity to removed with a wire brush or the like.

Accordingly, there is a clearly felt need in the art for a lubricating hitch receiver cover that protects the female cavity of a hitch receiver from rusting.

SUMMARY OF THE INVENTION

The present invention provides a lubricating hitch receiver cover, which is inserted into a female hitch receiver to protect thereof against rusting. The lubricating hitch receiver cover preferably includes a male body, an end cap, a quantity of lubricant and a fastener. The end cap terminates one end of the male body. An outer perimeter of the male body is sized to be received by a female cavity of the female hitch receiver. The quantity of lubricant is applied to the outside surface of the male body. A retention hole is formed through a cross section of the male body. The fastener is inserted through the female hitch receiver and the male body to retain the lubricating hitch receiver in the female hitch receiver. The lubricant applied to the male body, not only prevents rusting inside the female cavity, but improves the ease of insertion of a hitch into the female hitch receiver.

A second embodiment of the lubricating hitch receiver cover preferably includes a male body, an end cap and a quantity of lubricant. The end cap terminates one end of the male body. An outer perimeter of the male body is sized to be received by a female cavity of the female hitch receiver. The quantity of lubricant is applied to the outside surface of the male body. A retention projection extends from at least one side of the male body. The retention projection is sized to be received by a hole formed through opposing walls of the female hitch receiver. The lubricant applied to the male body, not only prevents rusting inside the female cavity, but improves the ease of insertion of a hitch into the female hitch receiver.

Accordingly, it is an object of the present invention to provide a lubricating hitch receiver cover that protects the female cavity of a female hitch receiver from rusting.

Finally, it is another object of the present invention to provide a lubricating hitch receiver cover that improves the ease of insertion of a hitch into a female hitch receiver.

These and additional objects, advantages, features and benefits of the present invention will become apparent from the following specification.

DETAILED DESCRIPTION OF THE PREFERRED EMBODIMENTS

Figure 1:
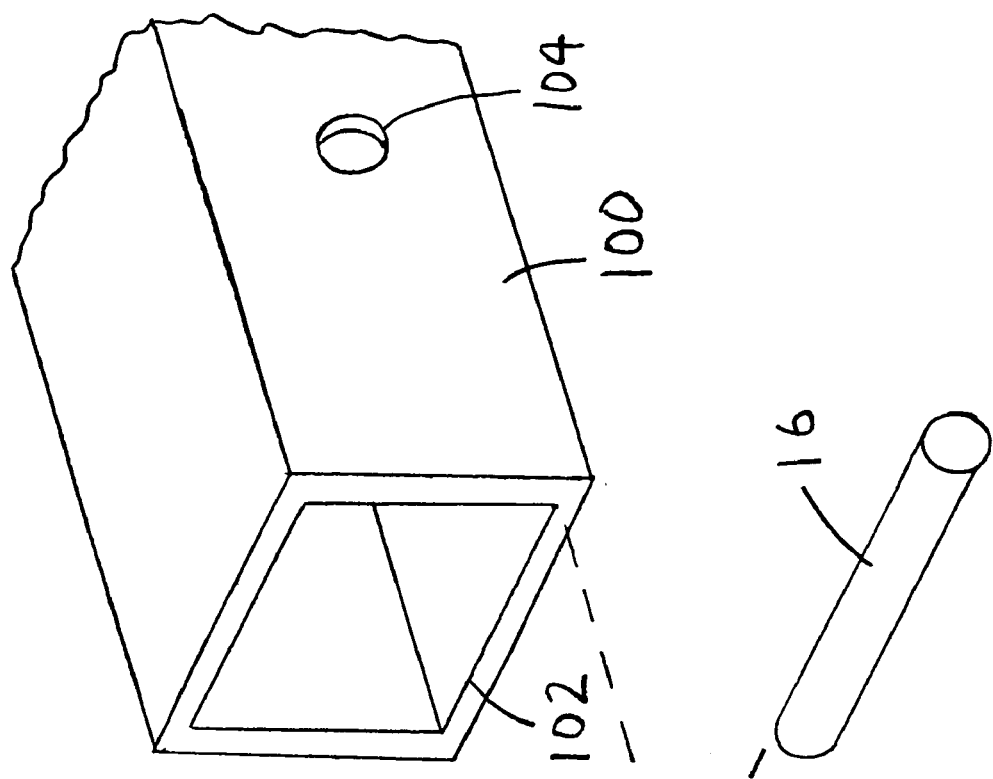
FIG. 1 is an exploded perspective view of a lubricating hitch receiver cover, adjacent an end of a female hitch receiver in accordance with the present invention.
Figure 1:
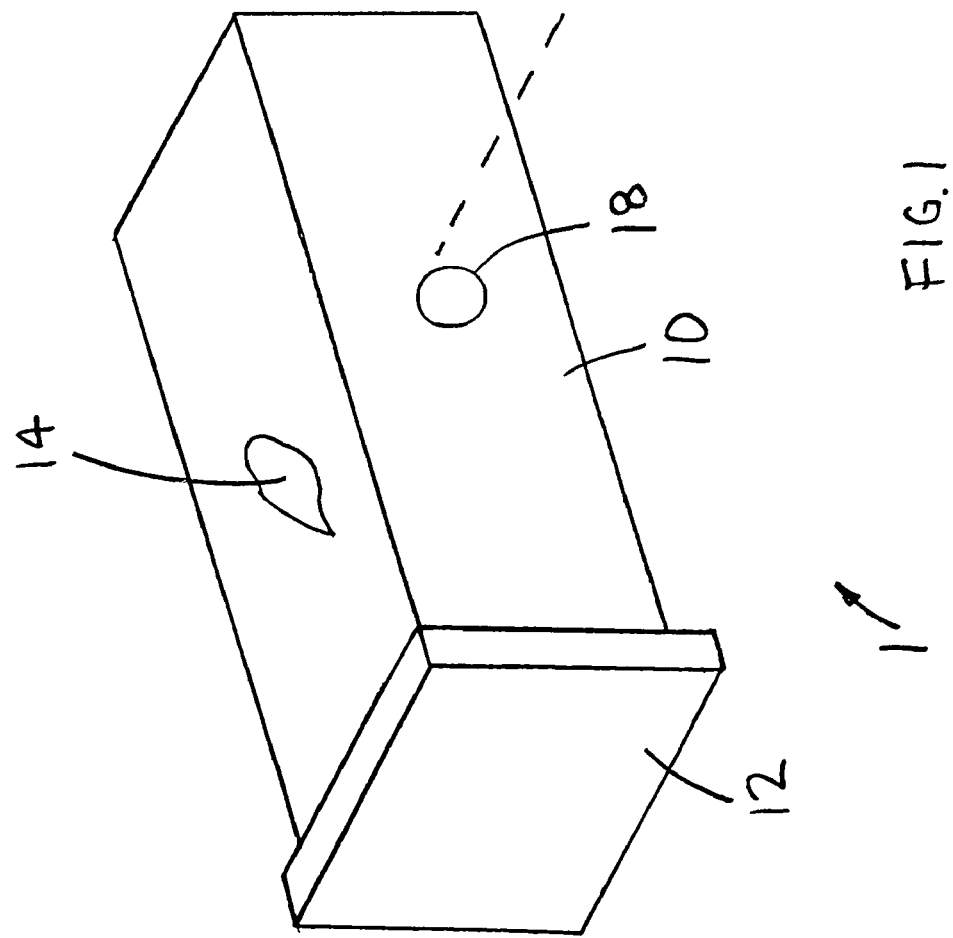
Figure 3:
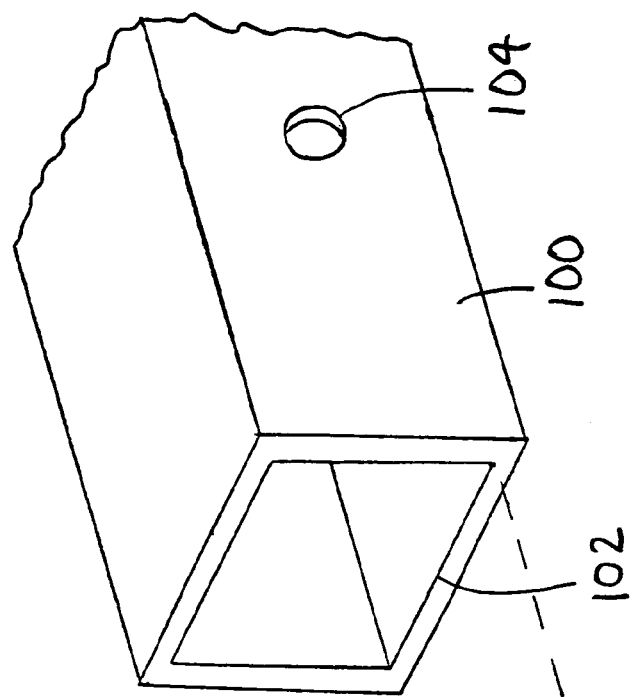
FIG. 3 is a partial top view of a second embodiment of a lubricating hitch receiver cover, illustrating two retention projections on opposing sides of a male body in accordance with the present invention.
Figure 2:
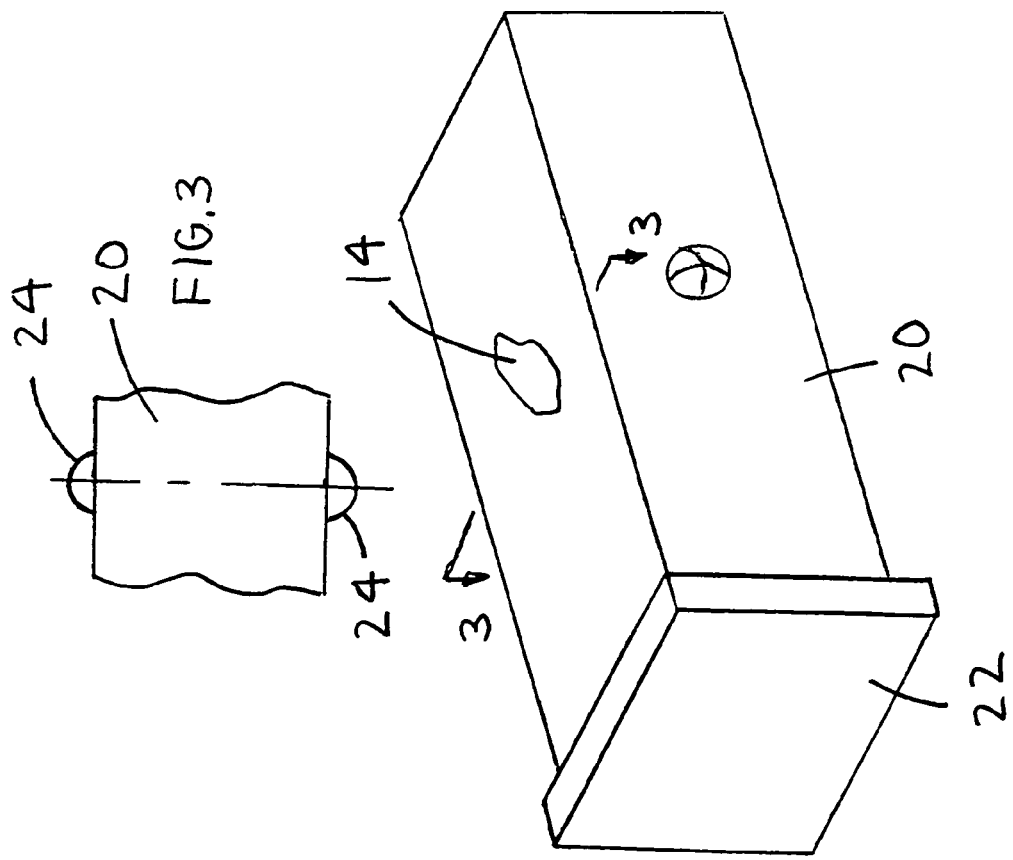
FIG. 2 is an exploded perspective view of a second embodiment of a lubricating hitch receiver cover, adjacent an end of a female hitch receiver in accordance with the present invention.

With reference now to the drawings, and particularly to FIG. 1, there is shown an exploded perspective view of a lubricating hitch receiver cover 1. The lubricating hitch receiver cover 1 preferably includes a male body 10, an end cap 12, a quantity of lubricant 14 and a fastener 16. The end cap 12 terminates one end of the male body 10. The end cap 12 and the male body 10 are preferably fabricated from a single piece of material, but could be fabricated from two pieces of material. The end cap 12 and the male body 10 are preferably fabricated from a closed cell foam or a closed cell rubber foam, but other materials may also be used. However, other structures besides an end cap may be used to withdraw the male body from the female hitch receiver 100. An outer perimeter of the male body 10 is sized to be received by an inside perimeter of a female cavity 102 in the female hitch receiver 100.

A retention pin hole 104 is formed through opposing walls of the female hitch receiver 100. The quantity of lubricant 14 is applied to an outside surface of the male body 10. The lubricant 14 is preferably grease, but other lubricants may also be used. A retention hole 18 is preferably formed through a cross section of the male body 10. The retention hole 18 is located in the male body 10, such that, when the male body 10 is fully inserted into the female cavity 102, the retention hole 18 is in-line with the retention pin hole 104.

The fastener 16 is inserted through the female hitch receiver 100 and the male body 10 to retain the lubricating hitch receiver cover 1 in the female hitch receiver 100. The fastener 16 is preferably cored out of the male body 10 with a cutting sleeve. Alternatively, the fastener 16 may be a dowel fabricated from any suitable material or any suitable fastener. The lubricant 14 applied to the male body 10, not only prevents rusting inside the female cavity 102, but improves the ease of insertion of a hitch into the female hitch receiver 100.

A second embodiment of the lubricating hitch receiver cover 2 preferably includes a male body 20, an end cap 22 and a quantity of lubricant 14. The end cap 22 terminates one end of the male body 20. The end cap 22 and the male body 10 are preferably fabricated from a single piece of material, but could be fabricated from two pieces of material. The end cap 22 and the male body 20 are preferably fabricated from a closed cell foam rubber, but other materials may also be used. However, other structures besides the end cap 22 may be used to withdraw the male body 20 from the female hitch receiver 100. An outer perimeter of the male body 20 is sized to be received by an inside perimeter of a female cavity 102 in the female hitch receiver 100.

The retention pin hole 104 is formed through opposing walls of the female hitch receiver 100. The quantity of lubricant 14 is applied to an outside surface of the male body 20. The lubricant 14 is preferably grease, but other lubricants may also be used. A projection 24 extends from at least one side of the male body 20. The projection 24 preferably has a dome shape, but other shapes may also be used. The projection 24 is located in the male body 20; such that, when the male body 20 is fully inserted into the female cavity 102; the projection 24 is received by the retention pin hole 104.

The projection 24 will compress into the body 20 during insertion through the female cavity 102. The projection 24 will release into the retention pin hole 104, when oriented concentric with the retention pin hole 104. The projection 24 will prevent the lubricating hitch receiver cover 2 from moving out of the female cavity 102. The lubricant 14 applied to the male body 10, not only prevents rusting inside the female cavity 102, but improves the ease of insertion of a hitch into the female hitch receiver 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of protecting a female cavity of a female hitch receiver, comprising the steps of:
    providing a male body that is sized to be received by an inside perimeter of the female cavity;
    forming a projection on at least one side of said male body, said projection compressing during insertion into the female hitch receiver, said projection extending into a retention pin hole in the female hitch receiver when concentric therewith;
    applying a quantity of lubricant to an outside surface of said male body; and
    inserting said male body into said the female cavity when the female hitch receiver is not in use.

2. The method of protecting a female cavity of a female hitch receiver of claim 1, further comprising the step of:
    providing a means for withdrawing said male body from said female cavity.

3. The method of protecting a female cavity of a female hitch receiver of claim 2, further comprising the step of:
    providing an end cap for said means for withdrawing said male body.

4. The method of protecting a female cavity of a female hitch receiver of claim 1, further comprising the step of:
    providing grease for said quantity of lubricant.

5. The method of protecting a female cavity of a female hitch receiver of claim 1, further comprising the step of:
    fabricating said male body from a closed cell rubber foam.

6. The method of protecting a female cavity of a female hitch receiver of claim 1, further comprising the step of:
    providing the female cavity with a retention pin hole formed through opposing walls thereof, said retention pin hole is sized to receive said projection.

7. A method of protecting a female cavity of a female hitch receiver, comprising the steps of:
    providing a male body that is sized to be received by an inside perimeter of the female cavity;
    applying a quantity of lubricant to an outside surface of said male body;
    forming a projection on at least one side of said male body, said projection compressing during insertion into the female hitch receiver, said projection extending into a retention pin hole in the female hitch receiver when concentric therewith; and
    inserting said male body into said the female cavity when the female hitch receiver is not in use, the female cavity including a retention pin hole formed through opposing walls thereof, said retention pin hole is sized to receive said projection.

8. The method of protecting a female cavity of a female hitch receiver of claim 7, further comprising the step of:
    providing a means for withdrawing said male body from said female cavity.

9. The method of protecting a female cavity of a female hitch receiver of claim 8, further comprising the step of:
    providing an end cap for said means for withdrawing said male body.

10. The method of protecting a female cavity of a female hitch receiver of claim 7, further comprising the step of:
    providing grease for said quantity of lubricant.

11. The method of protecting a female cavity of a female hitch receiver of claim 7, further comprising the step of:
    fabricating said male body from a closed cell rubber foam.

\* \* \* \* \*